US011872927B2

United States Patent
James et al.

(10) Patent No.: US 11,872,927 B2
(45) Date of Patent: Jan. 16, 2024

(54) TAIL LAMP BACK DOOR/TAILGATE ACTIVATION SWITCH

(71) Applicant: Toyota Motor Engineering & Manufacturing North America, Inc., Plano, TX (US)

(72) Inventors: Kevin J. James, Saline, MI (US); Taun-Min Chan, Northville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 386 days.

(21) Appl. No.: 16/874,797

(22) Filed: May 15, 2020

(65) Prior Publication Data

US 2021/0354641 A1 Nov. 18, 2021

(51) Int. Cl.
*B60Q 1/00* (2006.01)
*B60R 16/00* (2006.01)
(Continued)

(52) U.S. Cl.
CPC .............. *B60Q 1/0076* (2013.01); *B60J 5/10* (2013.01); *B60L 1/006* (2013.01);
(Continued)

(58) Field of Classification Search
CPC . B60R 16/005; B60R 11/0217; B60R 13/005; B60R 16/0239; B60R 25/34;
(Continued)

(56) References Cited

U.S. PATENT DOCUMENTS

| 4,027,129 A | 5/1977 | Sato |
| 4,782,200 A | 11/1988 | Oba |

(Continued)

FOREIGN PATENT DOCUMENTS

| CN | 203521921 U | 4/2014 |
| CN | 207122862 U | 3/2018 |

(Continued)

OTHER PUBLICATIONS

The Ford EcoSport Has a Cool Hidden Door Handle. Doug DeMuro, May 2018.

*Primary Examiner* — Quan Zhen Wang
*Assistant Examiner* — Rajsheed O Black-Childress
(74) *Attorney, Agent, or Firm* — SNELL & WILMER LLP

(57) ABSTRACT

A system for controlling a function of a vehicle by activation of a vehicle button includes a vehicle component configured to receive a signal and to perform an electrical or mechanical function in response to receiving the signal. The system further includes a physical structure located on an exterior of the vehicle and having an integrated button such that at least one of manual actuation of or physical proximity to the physical structure initiates a button selection event. The system further includes an electronic control unit (ECU) coupled to the vehicle component and to the integrated button and configured to identify the button selection event and to transmit the signal to the vehicle component in response to identifying the button selection event to cause the vehicle component to perform the electrical or mechanical function.

19 Claims, 3 Drawing Sheets

(51) Int. Cl.
*B60R 16/023* (2006.01)
*B60J 5/10* (2006.01)
*B60R 25/34* (2013.01)
*B60R 13/00* (2006.01)
*B60L 1/00* (2006.01)
*B60R 11/02* (2006.01)
*B62D 33/027* (2006.01)

(52) U.S. Cl.
CPC ........ *B60R 11/0217* (2013.01); *B60R 13/005* (2013.01); *B60R 16/005* (2013.01); *B60R 16/0239* (2013.01); *B60R 25/34* (2013.01); *B62D 33/0273* (2013.01)

(58) Field of Classification Search
CPC ... B60J 5/10; B60L 1/006; B60Q 1/24; B60Q 1/0076; B62D 33/0273
See application file for complete search history.

(56) References Cited

U.S. PATENT DOCUMENTS

| | | | |
|---|---|---|---|
| 9,636,978 | B2 | 5/2017 | Warburton et al. |
| 9,968,165 | B1* | 5/2018 | Ramadhan .............. E05B 13/00 |
| 10,072,447 | B2 | 9/2018 | Fujiwara |
| 11,371,270 | B2* | 6/2022 | Leonardi ................. E05B 81/86 |
| 2010/0314228 | A1 | 12/2010 | Huang |
| 2017/0328115 | A1* | 11/2017 | Matsui .................... E05B 49/00 |
| 2018/0154864 | A1* | 6/2018 | Kunze ................ G07C 9/00182 |
| 2021/0122333 | A1* | 4/2021 | Azarko ............. G07C 9/00309 |

FOREIGN PATENT DOCUMENTS

| | | |
|---|---|---|
| CN | 207905580 U | 9/2018 |
| CN | 107380017 B | 12/2019 |
| DE | 102019003353 A1 | 11/2019 |

* cited by examiner

TAIL LAMP BACK DOOR/TAILGATE ACTIVATION SWITCH

BACKGROUND

1. Field

The present disclosure relates to systems and methods for controlling one or more vehicle component using a button integrated with an external vehicle component.

2. Description of the Related Art

Nowadays, vehicles include controllers and processors for controlling various operations of the vehicles. For example, the controllers may control various aspects of a drive train (e.g., controlling timing of an engine or controlling a gear ratio of a transmission), may control operation of an audio system of the vehicle, may control operation of door locks (e.g., based on data received from a remote key fob), or the like. However, most of these functions require an individual vehicle user to be located in the vehicle as input devices for controlling the vehicle components are located on a dashboard or elsewhere in the vehicle cabin.

It is occasionally desirable for a vehicle component to perform a function when the vehicle user is located outside of the vehicle. For example, it may be desirable for the doors to be unlocked before the user enters the vehicle. As another example, it may be desirable for a tailgate to open automatically, for example, if the user is approaching the vehicle with a heavy load in his arms to be stored in the truck bed. As yet another example, it may be desirable for an outlet located on an exterior of the vehicle to be supplied with power without the user having to physically enter the vehicle (for example, if the user is barbecuing in the bed of his truck and needs power supplied to a blender). It may also be desirable for the vehicle component to be controlled without requiring a dexterous movement such as selection of a small button underneath a lip (e.g., a button under a door handle of a rear door).

In that regard, systems and methods for controlling functions of vehicle components while a vehicle user is outside of a vehicle cabin are desirable.

SUMMARY

Described herein is a system for controlling a function of a vehicle by activation of a vehicle button. The system includes a vehicle component design to receive a signal and to perform an electrical or mechanical function in response to receiving the signal. The system further includes a physical structure located on an exterior of the vehicle and having an integrated button such that at least one of manual actuation of or physical proximity to the physical structure initiates a button selection event. The system further includes an electronic control unit (ECU) coupled to the vehicle component and to the integrated button and design to identify the button selection event and to transmit the signal to the vehicle component in response to identifying the button selection event to cause the vehicle component to perform the electrical or mechanical function.

Also disclosed is a system for controlling a function of a vehicle by activation of a vehicle button. The system includes a vehicle component designed to receive a signal and to perform an electrical or mechanical function in response to receiving the signal. The system further includes a physical structure located on an exterior of the vehicle. The system further includes a button located near or on the physical structure such that at least one of manual actuation of or physical proximity to the physical structure initiates a button selection event. The system further includes an electronic control unit (ECU) coupled to the vehicle component and to the button and design to identify the button selection event and to transmit the signal to the vehicle component in response to identifying the button selection event to cause the vehicle component to perform the electrical or mechanical function.

Also disclosed is a method for controlling a function of a vehicle by activation of a vehicle button. The method includes detecting, by a button, a button selection event in response to at least one of manual actuation of a physical structure of the vehicle or physical proximity to the physical structure. The method further includes identifying, by an electronic control unit (ECU), the button selection event. The method further includes transmitting, by the ECU, a signal to a vehicle component in response to identifying the button selection event. The method further includes performing, by the vehicle component, an electrical or mechanical function in response to receiving the signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for controlling a function of a vehicle component by activation of an integrated vehicle button. The systems provide various benefits and advantages such as allowing control of one or more vehicle component by a vehicle user located outside of the vehicle. This advantageously allows the user to control various vehicle functions such as automatic opening of a vehicle door, controlling an audio system to play music, or turning on one or more external light without having to enter the vehicle. This provides the benefit of increasing functionality of the vehicle. The systems also advantageously integrate a button into an external physical structure of the vehicle (e.g., a light cover, a bumper, an emblem, or the like). This advantageously allows the user to, for example, open a hatch, rear, or trunk door without having to use his hands to fumble around for a handle (e.g., the user may depress the button by elbowing or kicking a bumper rather than using his finger to select a small exposed button). This may be beneficial, for example, if the user is carrying a heavy load to be stored in the rear of the vehicle. Because the button is integrated with a physical structure on the exterior of the vehicle, the button is advantageously hidden from thieves and other individuals.

An exemplary system includes a vehicle component (e.g., a door actuator, door locks, audio system, or the like) that is designed to perform an electrical or mechanical function in response to receiving a signal. The system further includes a physical structure (e.g., a bumper, a light cover, an emblem, or the like). The physical structure may include an integrated button which may include a manual button located behind the physical structure, a capacitive touch sensor, a proximity sensor, or the like. In response to actuation of the physical structure (or in response to physical proximity of a body part to the sensor), the button may output a signal. The system further includes an electronic control unit (ECU) coupled to the vehicle component and to the button. The ECU may receive the signal from the button and may control the vehicle component based on the signal received from the button.

Figure 1:
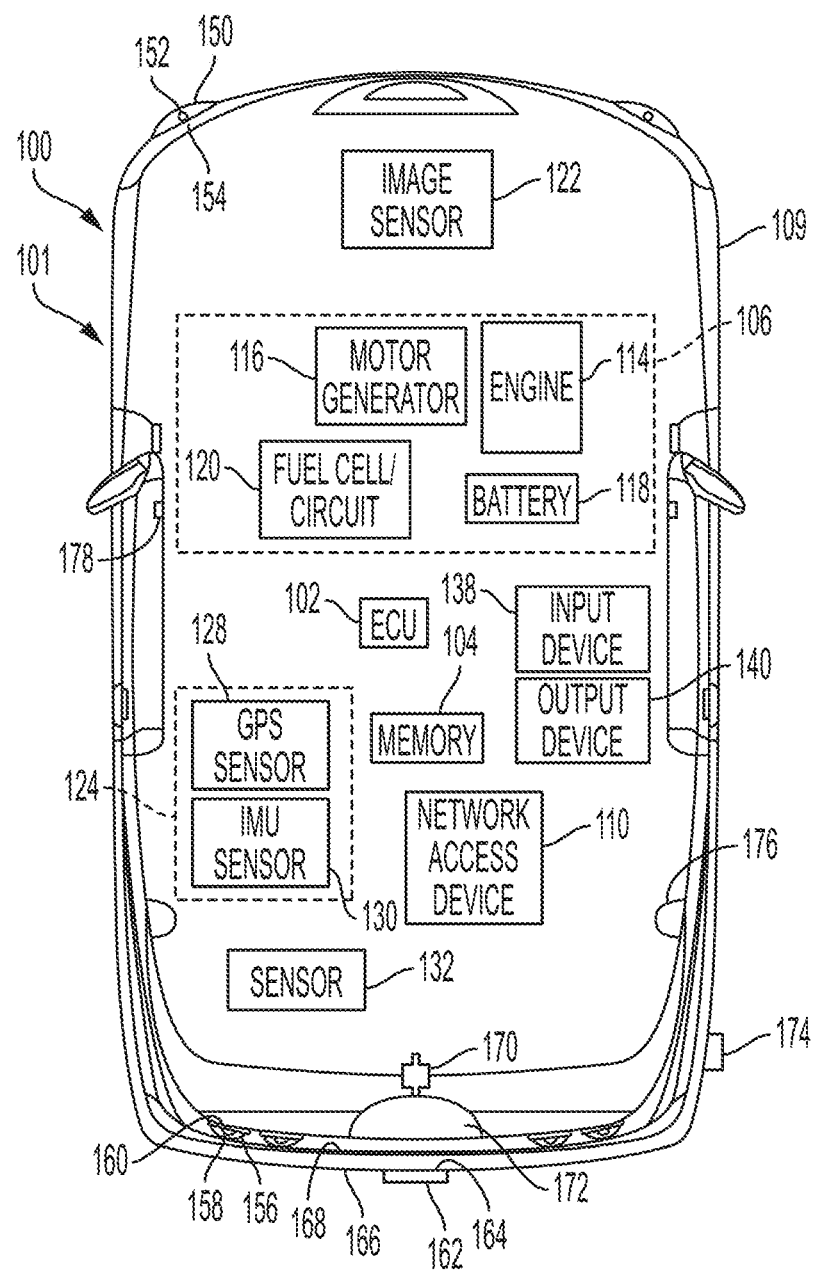
FIG. 1 is a block diagram illustrating a vehicle having a system for controlling a function of a vehicle component by activation of an integrated vehicle button according to an embodiment of the present invention.

Turning to FIG. 1, a vehicle 100 may include a system 101 for controlling a function of the vehicle 100 by activation of a vehicle button. The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may also include an input device 138 and an output device 140. The vehicle 100 may further include various vehicle components capable of performing electrical or mechanical functions such as an audio system including one or more speaker 176, a rear vehicle door 172 coupled to an actuator 170, a power outlet 174, or the like. The vehicle 100 may also include various physical structures such as lights and associated covers (e.g., a front light 152 and a front light cover 150), bumpers (e.g., a rear bumper 166), a vehicle manufacturer emblem 162, or the like. One or more button may be integrated with, or otherwise coupled to, one or more of the physical structures (e.g., a button 154 may be integrated with the front light cover 150).

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like.

The ECU 102 may be coupled to each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, control one or more vehicle component based on input received from one or more button (e.g., the button 154).

The memory 104 may include any non-transitory memory and may store data usable by the ECU 102. For example, the memory 104 may store instructions usable by the ECU 102 to control the vehicle component based on the received button input. The memory 104 may be located in or on the main body 109 and may thus be referred to as a local memory.

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user. The input device 138 may receive user input corresponding to a desired operation of a vehicle component in response to a particular input received by a button or other input device. For example, the input may include a user specifying that all vehicle doors are to be locked in response to a single, short depression of the integrated button 154, and that the rear vehicle door 172 is to be automatically opened in response to a long depression of the integrated button 154 (e.g., a depression that is longer than 3 seconds). The memory 104 may store data including desired operations corresponding to each input received by each button.

The output device 140 may include any output device such as the speaker 176, a display, a touchscreen, or the like. The output device 140 may output data to a user of the vehicle, such as the currently desired operation of the vehicle component. For example, the output device 140 may display data indicating the desired operation of the vehicle component (e.g., that the vehicle doors are to be locked in response to the single, short depression of the integrated button 154). As another example, the output device 140 may output data indicating that the desired action has been performed in response to the depression of the button.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device.

For example, the network access device 110 may communicate with a remote key fob, such as by identifying the presence of the key fob within a predetermined distance of the vehicle 100 (e.g., it may identify the presence of the key fob when the key fob is within 10 feet of the vehicle 100). In some embodiments, the desired action to be performed by the vehicle component may only occur when the key fob is within the predetermined distance of the vehicle 100. For example, the desired action may be for the speaker 176 to begin to output music in response to the integrated button 154 being depressed. In that regard, the ECU 102 may only control the speaker 176 to output the music in response to both the key fob being within the predetermined distance of the vehicle and in response to the button 154 being depressed.

The vehicle 100 may include multiple integrated or other buttons. As referenced above, the vehicle 100 may include multiple external light sources including a front light 152, a rear light 158, or the like. One or more of the front light sources may include the front light 152, the front light cover 150 that encloses or otherwise covers the front light 152, and the button 154 integrated into the vehicle body 109. Additionally, one or more of the rear light sources may include a rear light 158, a rear light cover 156, and a button 160 integrated into the vehicle body 109.

The emblem 162 may likewise include a button 164 coupled thereto or integrated into the vehicle body 109. In response to a depression of the emblem 162, the button 164 may likewise become depressed. In addition, the bumper 166 may be capable of being actuated by a user and may include or be coupled to a button 168. In that regard and in response to actuation of the bumper 166, the button 168 may become depressed.

Any one or more of the buttons 154, 160, 164, 168 may be used to control one or more vehicle component. In that regard, the ECU 102 may be coupled to each of the buttons 154, 160, 164, 168 and may receive a signal indicating when the button has been depressed (along with any other information corresponding to the depression such as a length of the depression, a quantity of repetitions of the depression, or the like). The ECU 102 may further be coupled to each of the vehicle components including the lights 154, 158, the actuator 170, the outlet 174, the speaker 176, vehicle door locks 178, or the like. In response to receiving a signal from a button, the ECU 102 may compare the received signal to the memory 104 to determine a corresponding desired operation.

For example, the memory 104 may store data indicating that the actuator 170 is to open the rear vehicle door 172 (which may include a rear door such as a hatchback, a tailgate, a trunk door, or the like) in response to a long depression of the integrated button 160. In response to a long depression of the integrated button 160, the ECU 102 may determine to control the actuator 170 to open the rear vehicle door 172.

As another example, the memory 104 may store data indicating that the outlet 174 is to begin outputting electrical power in response to two short depressions of the integrated button 160. In response to the two short depressions of the integrated button 160, the ECU 102 may control the power source 106 to provide power to the outlet 174.

As yet another example, the memory 104 may store data indicating that the engine 114 is to start up in response to any depression of the button 164. In response to any depression of the button 164, the ECU 102 may control the engine 114 to start up.

A vehicle user may provide input to the vehicle 100 to perform any function associated with a vehicle component in response to any depression or combination of depressions of any vehicle button. For example, a user may provide input indicating that a heating, ventilation, and air conditioning (HVAC) system of the vehicle is to begin cooling an interior of the vehicle 100 at max cool in response to a short depression of the button 154, and to control the HVAC system to begin heating the interior of the vehicle 100 at max heat in response to a long depression of the button 154. In some embodiments, the ECU 102 may be pre-programmed by the vehicle manufacturer to perform various operations in response to specific button selections, may be programmed to perform various additional or alternative operations in response to specific button selections, or any combination thereof.

In some embodiments, the ECU 102 may be designed to only perform a specific operation based on input received from one or more button and based on data detected by the location sensor 124, the image sensor 122, or the sensor 132. For example, if the desired action is for the outlet 174 to output electrical power, the ECU 102 may only control the outlet 174 to output the power if one or more sensor (and/or data received by the network access device 110) indicate a lack of rain. As yet another example, if the desired action is for the HVAC system to blow air conditioned air at max cool, the ECU 102 may only control the HVAC system to blow at max cool if the temperature inside or outside of the vehicle is 60 degrees or greater.

Figure 2A:
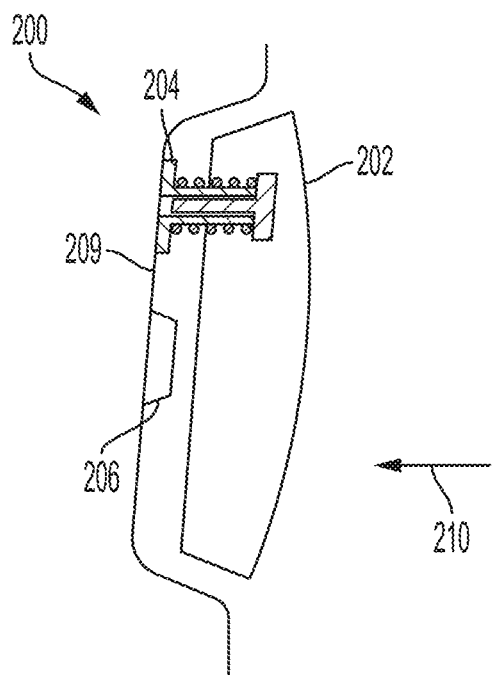
FIGS. 2A, 2B, and 2C are drawings illustrating various buttons integrated with physical structures located on an exterior of a vehicle according to an embodiment of the present invention.

Referring now to FIG. 2A, a system 200 may include a physical structure 202 (e.g., a vehicle light cover, and emblem, a bumper, or the like) and an integrated button 206. The physical structure 202 may be coupled to a vehicle body 209 via a compression spring 204. A button 206 may be coupled to the vehicle body 209 between the physical structure 202 and the vehicle body 209. In response to actuation of the physical structure 202 in a direction shown by an arrow 210 (e.g., towards the vehicle body 209), the physical structure 202 may depress the button 206. When pressure is removed from the physical structure 202, the compression spring 204 may cause the physical structure 202 to return to its initial position.

Figure 2B:
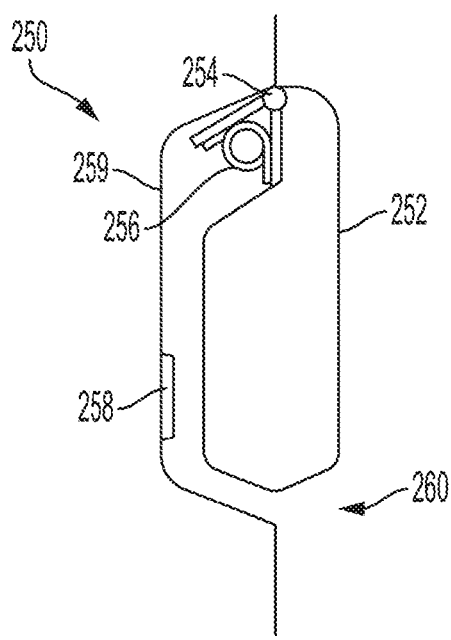

Referring now to FIG. 2B, a system 250 may include a physical structure 252 and an integrated button 258. The physical structure 252 may be coupled to a vehicle body 259 via a hinge 254 and a hinge spring 256. The button 258 may be coupled to the vehicle body 259 between the vehicle body 259 and the physical structure 252. In response to actuation of the physical structure 252 along the direction of the hinge 254 (as shown by an arrow 260), the physical structure 252 may depress the button 258. When pressure is removed from the physical structure 252, the hinge spring 256 may cause the physical structure 252 to return to its initial position.

Figure 2C:
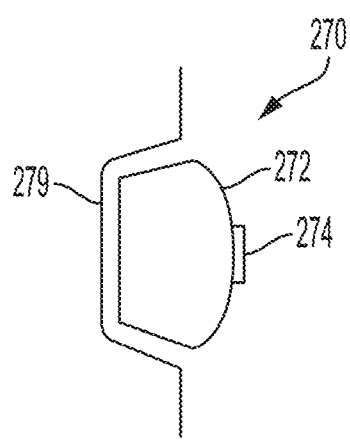

Referring now to FIG. 2C, a system 270 may include a physical structure 272 coupled to a vehicle body 279, and a button 274 (which may include a proximity sensor or a touch sensor) coupled to the physical structure 272 (or to the vehicle body 279). The button 274 may include a proximity sensor designed to detect the presence of a human body part within a predetermined distance of the button 274. In response to a human body part being within the predetermined distance, the button 274 may generate a signal to be received by an ECU. The button 274 may also or instead include a capacitive touch sensor designed to detect contact with a human body part. In response to a human body part making contact with the capacitive touch sensor, the button 274 may generate a signal to be received by an ECU.

Figure 3:
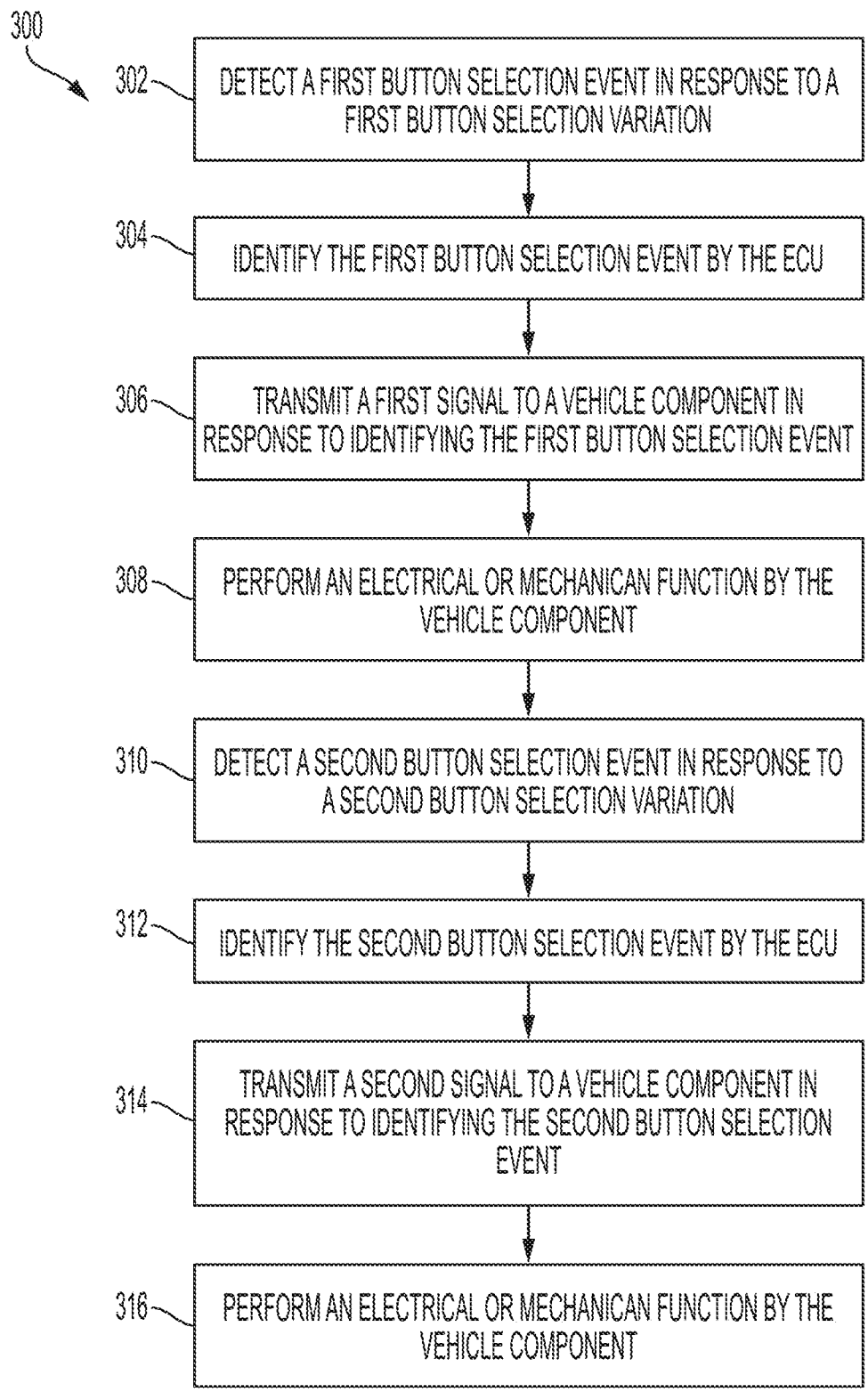
FIG. 3 is a flowchart illustrating a method for controlling a function of a vehicle component by activation of an integrated vehicle button according to an embodiment of the present invention.

Referring now to FIG. 3, a method 300 for controlling a function of a vehicle component by activation of a vehicle button is shown. The method 300 begins after a memory of the vehicle has been programmed with desirable vehicle functions using a vehicle input device. In some embodiments, the memory may be preprogrammed with the vehicle functions such that programming of the memory is unnecessary. The vehicle button may be integrated with a physical structure, such as a physical structure on an external portion of the vehicle. The button may include a manual button, a proximity sensor, a touch sensor, or the like. In that regard, the button may be activated in response to manual actuation of the physical structure or in response to contact with, or proximity to, the button by a human body part (or another physical object).

The method 300 may begin in block 302 where a first button selection event is detected by a button. For example, a first button selection variation may be used to depress the first button. The first button selection variation may include any pattern of button depressions such as a relatively short button depression (e.g., a depression of the bottom that lasts for less than one second, two seconds, three seconds, or the like), a relatively long button depression (e.g., a depression of the button that lasts for more than one, two, or three seconds), two relatively short depressions, two relatively long depressions, a relatively short depression followed by a relatively long depression, or the like. In response to receiving the first button selection variation, the button may transmit a signal indicating the first button selection variation to a vehicle ECU.

In block 304, the ECU may identify the first button selection event by comparing the first button selection variation to the memory. For example, if the first button selection variation includes two short depressions then the ECU may identify the first button selection event as an item in the memory that includes two short depressions of the specific button. In some embodiments, the vehicle may include two or more external buttons. In that regard, the first button selection event may include an identifier of a selected button along with the selected button selection variation. Based on the comparison with the memory, the ECU may identify a vehicle component to be controlled along with a desired operation of the vehicle component. For example, the vehicle component may include an actuator coupled to a vehicle door, door locks, an audio system of the vehicle, or the like, and the desired operation may include opening the vehicle door, locking or unlocking the door locks, playing music via the audio system, or the like.

In block 306, the ECU may transmit a first signal to the vehicle component associated with the first button selection event in response to identifying the first button selection event. The first signal may include a control signal that indicates the desired operation of the vehicle component. For example, if the first button selection event corresponds to a request to unlock the door locks then the ECU may transmit a signal to the door locks causing the door locks to unlock in response to the ECU identifying the first button selection event. As mentioned above, in some embodiments the ECU may only transmit a signal to the vehicle component in response to identifying the first button selection event and in response to a key fob being within a predetermined distance of the vehicle. As further mentioned above, in some embodiments the ECU may only transmit the signal to the vehicle component in response to identifying the first button selection event and further based on data detected by one or more vehicle sensor.

In block 308, the specific vehicle component may perform an electrical or mechanical function in response to receiving the first signal from the ECU. Continuing the example above, an actuator coupled to the door locks may cause the door locks to be unlocked in response to the actuator receiving the first signal from the ECU. As another example, if the desired action is for an actuator to open a rear vehicle door then the actuator may actuate to open the rear vehicle door in response to receiving the first signal from the ECU.

In block 310, the button or another button may detect a second button selection event in response to a second button selection variation. In some embodiments, the button may be the same button and the second button selection variation may include a different variation than the first button selection variation. In some embodiments, the button may be a different button and the second button selection variation may be the same as or different than the first button selection variation. The second button selection variation may include any pattern of button depressions. In response to receiving the second button selection variation, the button may transmit a signal indicating the second button selection variation to the ECU.

In block 312, the ECU may identify the second button selection event by comparing the second button selection variation to the memory. Based on the comparison with the memory, the ECU may identify a vehicle component to be controlled along with a desired operation of the vehicle component.

In block 314, the ECU may transmit a second signal to the vehicle component associated with the second button selection event in response to identifying the second button selection event. The second signal may include a control signal that indicates the desired operation of the vehicle component. For example, if the second button selection event corresponds to a request to unlock the door locks then the ECU may transmit a signal to the door locks causing the door locks to unlock in response to the ECU identifying the second button selection event.

In block 316, the vehicle component associated with the second button selection event may perform an electrical or mechanical function corresponding to the desired operation of the vehicle component.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling a function of a vehicle by activation of a button, the system comprising:
   a first vehicle component including an actuator configured to receive a first signal and to perform a first electrical or mechanical function in response to receiving the first signal and to receive a second signal and to perform a second electrical or mechanical function that is different than the first electrical or mechanical function, the first electrical or mechanical function and the second electrical or mechanical function includes at least controlling a vehicle light between an on state and an off state or actuating at least one of a rear vehicle door, a tailgate, or a back vehicle door from a closed position to an open position or from the open position to the closed position;
   a physical structure located on an exterior of the vehicle and coupled to the button such that at least one of manual actuation of, or physical proximity to, the physical structure initiates at least one of a first button selection event or a second button selection event, the physical structure includes the vehicle light and a vehicle light cover at least partially enclosing the vehicle light; and
   an electronic control unit (ECU) coupled to the actuator and to the button and configured to:
      identify the first button selection event and to transmit the first signal to the actuator in response to identifying the first button selection event to cause the actuator to perform the first electrical or mechanical function, the first button selection event identified in response to a first button selection variation including a first pattern of button depressions; and
      identify the second button selection event and to transmit the second signal to at least one of the actuator or a second vehicle component in response to identifying the second button selection event to cause the at least one of the actuator or the second vehicle component to perform the second electrical or mechanical function, the second button selection event identified in response to a second button selection variation including a second pattern of button depressions different from the first pattern of button depressions.

2. The system of claim 1 further comprising a spring, wherein the vehicle light cover is coupled to the spring such that the vehicle light cover activates the button in response to manual actuation of the vehicle light cover.

3. The system of claim 2 wherein at least one of:
   the spring is a compression spring such that the cover is actuated towards the button in response to compression of the compression spring; or
   the spring is a hinge spring such that the cover hinges about the hinge spring towards the button in response to rotation of the hinge spring.

4. The system of claim 2 wherein the vehicle light and the vehicle light cover are located on a rear portion of the vehicle, the vehicle light is rear facing, and the vehicle light and the vehicle light cover are part of a tail lamp assembly for the vehicle.

5. The system of claim 4 wherein the actuator actuates at least one of the rear vehicle door, the tailgate, or the back vehicle door.

6. The system of claim 1 wherein the first electrical or mechanical function includes at least one of opening or closing a vehicle door, at least one of locking or unlocking the vehicle door, providing electrical power to an outlet of the vehicle, or playing music from a speaker of the vehicle.

7. The system of claim 1 wherein the button includes at least one of a proximity sensor configured to detect a presence of a human body part within a predetermined distance of the proximity sensor such that the presence of the human body part initiates the first button selection event, or a capacitive touch sensor configured to detect contact with the human body part such that the contact initiates the first button selection event.

8. The system of claim 1 wherein the first button selection event is detected by the button.

9. The system of claim 1 wherein the vehicle light and the vehicle light cover are located on a front portion of the vehicle, the vehicle light is front facing, and the vehicle light and the vehicle light cover are part of a head lamp assembly for the vehicle.

10. A system for controlling a function of a vehicle, the system comprising:
    a first vehicle component including an actuator configured to receive a first signal and to perform a first electrical or mechanical function in response to receiving the first signal and to receive a second signal and to perform a second electrical or mechanical function that is different than the first electrical or mechanical function, the first electrical or mechanical function and the second electrical or mechanical function includes at least controlling a vehicle light between an on state and an off state or actuating at least one of a rear vehicle door, a tailgate, or a back vehicle door from a closed position to an open position or from the open position to the closed position;

a physical structure located on an exterior of the vehicle, the physical structure includes the vehicle light and a vehicle light cover at least partially enclosing the vehicle light;

a button located near or on the physical structure such that at least one of manual actuation of, or physical proximity to, the physical structure initiates a first button selection event and a second button selection event; and an electronic control unit (ECU) coupled to the actuator and to the button and configured to:

identify the first button selection event and to transmit the first signal to the actuator in response to identifying the first button selection event to cause the actuator to perform the first electrical or mechanical function, the first button selection event identified in response to a first button selection variation including a first pattern of button depressions; and identify the second button selection event and to transmit the second signal to at least one of the actuator or a second vehicle component in response to identifying the second button selection event to cause the at least one of the actuator or the second vehicle component to perform the second electrical or mechanical function, the second button selection event identified in response to a second button selection variation including a second pattern of button depressions different from the first pattern of button depressions.

11. The system of claim 10 further comprising a spring, wherein the vehicle light cover is coupled to the spring such that the vehicle light cover activates the button in response to manual actuation of the vehicle light cover.

12. The system of claim 11 wherein at least one of:
the spring is a compression spring such that the cover is actuated towards the button in response to compression of the compression spring; or
the spring is a hinge spring such that the cover hinges about the hinge spring towards the button in response to rotation of the hinge spring.

13. The system of claim 11 wherein the vehicle light and the vehicle light cover are located on a rear portion of the vehicle, the vehicle light is rear facing, and the vehicle light and the vehicle light cover are part of a tail lamp assembly.

14. The system of claim 13 wherein the actuator actuates at least one of the rear vehicle door, the tailgate, or the back vehicle door.

15. The system of claim 10 wherein the first electrical or mechanical function includes at least one of opening or closing a vehicle door, at least one of locking or unlocking the vehicle door, providing electrical power to an outlet of the vehicle, or playing music from a speaker of the vehicle.

16. The system of claim 10 wherein the button includes at least one of a proximity sensor configured to detect presence of a human body part within a predetermined distance of the proximity sensor such that the presence of the human body part initiates the first button selection event, or a capacitive touch sensor configured to detect contact with the human body part such that the contact initiates the first button selection event.

17. The system of claim 10 wherein the vehicle light and the vehicle light cover are located on a front portion of the vehicle, the vehicle light is front facing, and the vehicle light and the vehicle light cover are part of a head lamp assembly for the vehicle.

18. A method for controlling a function of a vehicle by activation of a button, the method comprising:

detecting, by the button, a first button selection event in response to at least one of manual actuation of a physical structure of the vehicle or physical proximity to the physical structure, the physical structure includes a vehicle light and a vehicle light cover at least partially enclosing the vehicle light;

detecting, by the button, a second button selection event in response to at least one of manual actuation of the physical structure of the vehicle or physical proximity to the physical structure;

identifying, by an electronic control unit (ECU), the first button selection event, the first button selection event identified in response to a first button selection variation including a first pattern of button depressions;

identifying, by the ECU, the second button selection event, the second button selection event identified in response to a second button selection variation including a second pattern of button depressions different from the first pattern of button depressions;

transmitting, by the ECU, a first signal to a first vehicle component including an actuator in response to identifying the first button selection event;

transmitting, by the ECU, a second signal to at least one of the actuator or a second vehicle component in response to identifying the second button selection event;

performing, by the actuator, a first electrical or mechanical function in response to receiving the first signal, the first electrical or mechanical function includes at least controlling the vehicle light between an on state and an off state or actuating at least one of a rear vehicle door, a tailgate, or a back vehicle door from a closed position to an open position or from the open position to the closed position; and performing, by the at least one of the actuator or the second vehicle component, a second electrical or mechanical function in response to receiving the second signal, the second electrical or mechanical function includes at least controlling the vehicle light between the on state and the off state.

19. The method of claim 18 wherein the first electrical or mechanical function includes at least one of opening or closing a vehicle door, at least one of locking or unlocking the vehicle door, providing electrical power to an outlet of the vehicle, or playing music from a speaker of the vehicle.

* * * * *